United States Patent [19]

Arnold et al.

[11] Patent Number: 5,128,443
[45] Date of Patent: Jul. 7, 1992

[54] RIGID-ROD BENZIMIDAZOLE PENDANT BENZOBISAZOLE COPOLYMER

[75] Inventors: Fred E. Arnold; Loon-Seng Tan, both of Centerville; Thuy D. Dang, Dayton, all of Ohio

[73] Assignee: The United States of America as represented by the Secretary of the Air Force, Washington, D.C.

[21] Appl. No.: 686,204

[22] Filed: Apr. 16, 1991

[51] Int. Cl.$^5$ .............. C08G 73/18; C08G 73/22; C08G 75/32

[52] U.S. Cl. .................. 528/337; 528/183; 528/190; 528/339; 528/341; 528/342; 528/344; 528/348

[58] Field of Search .............. 528/337, 183, 190, 341, 528/339, 342, 344, 348

[56] References Cited

U.S. PATENT DOCUMENTS 4,892,921  1/1990  Tsai et al. ............... 528/183
4,892,953  1/1990  Arnold et al. ............ 548/156

Primary Examiner—Harold D. Anderson
Attorney, Agent, or Firm—Charles E. Bricker; Donald J. Singer

[57] ABSTRACT

Provided is a para-ordered aromatic heterocyclic copolymer having repeating units of the formula $-(-Q-Ar-)_m-(-Q-Ph-)_n-$ wherein Q is

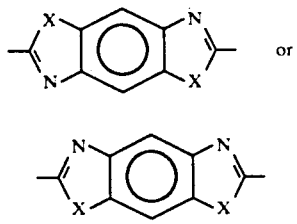

wherein X is —O—, —NH— or —S—, m is 0.05 to 0.50 and n is 1.0—m, Ph is 1,4-phenylene, and wherein Ar is

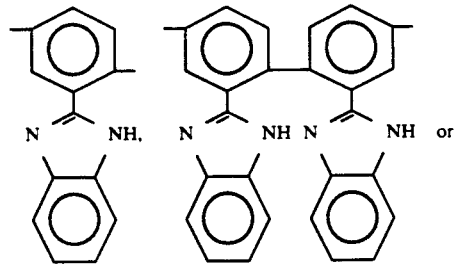

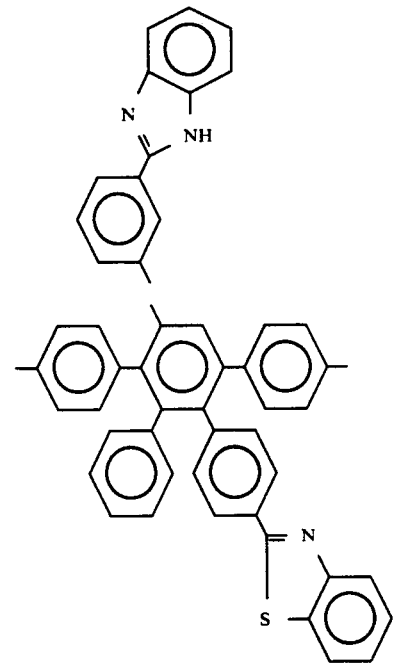

2 Claims, No Drawings

RIGID-ROD BENZIMIDAZOLE PENDANT BENZOBISAZOLE COPOLYMER

RIGHTS OF THE GOVERNMENT

The invention described herein may be manufactured and used by or for the Government of the United States for all governmental purposes without the payment of any royalty.

BACKGROUND OF THE INVENTION

This invention relates to para-ordered aromatic copolymers containing pendant benzimidazole groups.

In general, the class of aromatic heterocyclic extended chain polymers are well known for their outstanding thermal, physical and chemical properties. These polymers generally exhibit excellent modulus and tenacity properties.

Tsai et al, U.S. Pat. No. 4,892,921, disclose that the aromatic heterocyclic extended chain polymers lack good properties when in compression. Tsai et al disclose para-ordered aromatic heterocyclic extended chain polymers having pendant benzoxazole and benzothiazole groups which have good properties when in compression.

Arnold et al, U.S. Pat. No. 4,892,953, disclose phenylbenzthiazole-substituted diacid terphenyl monomers which are used for making aromatic heterocyclic extended chain polymers which exhibit improved compressive properties.

We have prepared new para-ordered aromatic benzimidazole-pendant copolymers which, when treated with phosphoric acid, exhibit improved thermooxidative stability as compared to alkaline treated polymers.

Accordingly, it is an object of the present invention to provide novel para-ordered aromatic heterocyclic copolymers containing pendant benzimidazole groups.

It is another object of the present invention to provide methods for preparing these para-ordered aromatic heterocyclic copolymers.

Other objects, aspects and advantages of the present invention will become apparent to those skilled in the art from a reading of the following detailed description of the invention.

SUMMARY OF THE INVENTION

In accordance with the present invention, there are provided copolymers having repeating units of the formula:

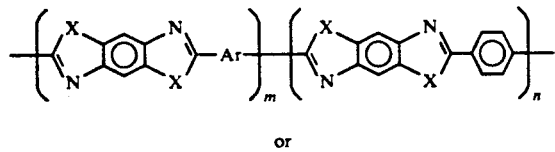

or

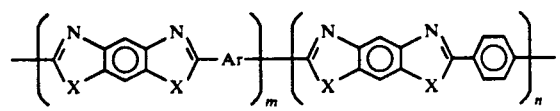

wherein X is —O—, —NH— or —S—, m is 0.05 to 0.50 and n is 1.0 - m, and wherein Ar is

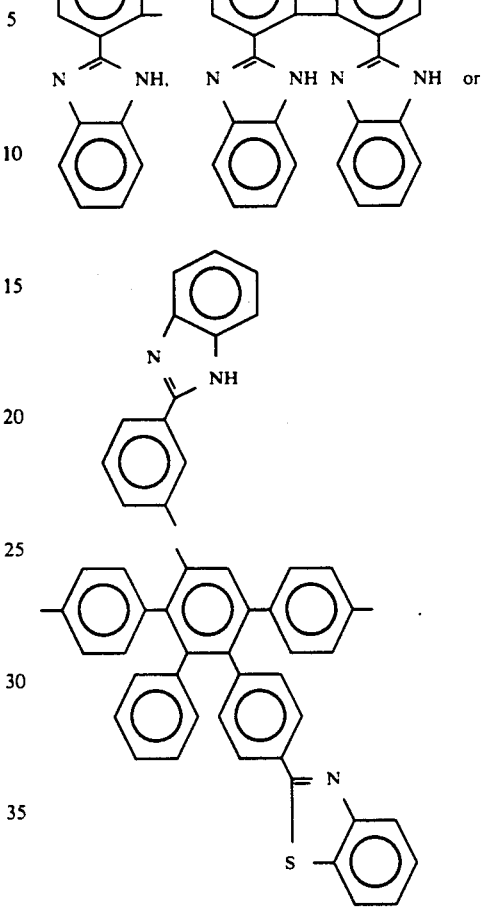

DESCRIPTION OF THE PREFERRED EMBODIMENTS

The polymers of this invention are prepared by the polycondensation of 4,6-diaminoresorcinol dihydrochloride, 2,5-diaminohydroquinone dihydrochloride, 4,6-diamino-1,3-benzenedithiol dihydrochloride, 2,5-diamino-1,4-benzenedithiol dihydrochloride, or 1,2,4,5-tetraaminobenzene tetrahydrochloride, a para-oriented dicarboxylic acid of the formula HOOC—Ar—COOH, wherein Ar is as described previously and terephthalic acid.

Preparation of the para-oriented dicarboxylic acids is described in our co-pending application Ser. No. 07/686,203, filed of even date herewith, now U.S. Pat. No. 5,081,256.

The polycondensation is carried out in polyphosphoric acid (PPA). In carrying out the process, stoichiometric amounts of the monomers are heated at about 40°-80° C. in 77 percent PPA to effect thermal dehydrochlorination of the amino hydrochloride monomer. This step is carried out under reduced nitrogen pressure to facilitate removal of the hydrogen chloride. After complete dehydrochlorination, the temperature is lowered to about 50° C. and P$_2$O$_5$ is added to provide about 82-84% PPA. The reaction mixture is then slowly heated under a nitrogen atmosphere to about 190° C., at atmospheric pressure. In general, the concentration of monomers in the acid ranges from about 0.5 to 12.0 percent.

Alternatively, the amino hydrochloride monomer may be mixed with PPA, then heated, under vacuum or an inert gas atmospherre to about 40°-80° over a period of 3 to 24 hours to dehydrochlorinate the amino monomer. At the end of this period, the dicarboxylic acids are added. An additional amount of $P_2O_5$ and/or PPA may be added as required to provide a stirrable mixture and to increase the PPA concentration to about 82-84%.

Preferably, the copolymerization is carried out in stages, i.e., a step-wise heating schedule is employed. Step-wise heating is preferred because immediately exposing the reaction mixture to relatively high copolymerization temperature may cause decomposition of the monomers. The selection of a particular step-wise heating schedule is obvious to one of ordinary skill in the art. An exemplary heating schedule is 60° C. for 4 hours, 100° C. for 2 hours, 160° C. for 24 hours and 190° C. for 4 hours.

At the end of the reaction period, the copolymer solution is in a very viscous or semi-solid state. After cooling, the product can be recovered by coagulation in water.

The molecular weight of these copolymers is commonly indicated by the inherent viscosity of the polymer. The inherent viscosity is commonly determined at a concentration of 0.2 weight/volume percent in methanesulfonic acid (MSA) at 30° C.

The copolymers produced in accordance with the invention may be used to produce fibers and sheets. In order to form these copolymers into fibers or sheets, dopes are prepared containing about 5 to 15 weight percent of the copolymer in a strong acid, such as sulfuric acid, MSA, chlorosulfuric acid, and the like, including mixtures thereof. Such dopes may be spun or extruded into a coagulation bath comprising water or a water/MSA mixture.

The following examples illustrate the invention:

EXAMPLE I

Into the bottom of a resin flask equipped with a mechanical stirrer, nitrogen inlet/outlet and pressure regulator, was placed 1.6613 g (10 mmol) of terephthalic acid, 2.8226 g (10 mmol) of 2-benzimidazole terephthalic acid, 4.904. g (20 mmol) of 2,5-diamino-1,4-benzenedithiol dihydrochloride and 28.9 g of PPA (77% $P_2O_5$). The resulting mixture was dehydrochlorinated under reduced pressure (176 mm) while heating slowly to 65° C. The reaction temperature was maintained at 65° C. for 16 hours, raised to 80° C. for 4 hours, then cooled to 60° C. 17.24 g $P_2O_5$ was added to the mixture to bring the polymer concentration to 12 percent. The mixture was heated under nitrogen atmosphere at 60° C. for 4 hours, 100° C. for 2 hours and 160° C. for 24 hours. As the temperature increased, stir opalescence began to occur at about 150° C. The mixture was finally heated to 190° C. for 4 hours. The polymer was precipitated in water, broken up with a blender, collected by suction filtration, washed with water and dried under reduced pressure (0.02 mm) at 100° C. Intrinsic viscosity, 10 dl/g.

Analysis calculated for $C_{35}H_{16}N_6S_4$: C, 64.79; H, 2.49; N, 12.95. Found: C, 63.40; H, 2.79; N, 11.80.

EXAMPLE II

Into the bottom of a resin flask equipped with a mechanical stirrer, nitrogen inlet/outlet and pressure regulator, was placed 1.6613 g of terephthalic acid (10 mmol), 2.8226 g (10 mmol) of 2-benzimidazole terephthalic acid, 4.2612 g (20 mmol) of 4,6-diaminoresorcinol dihydrochloride and 25.43 g of PPA (77% $P_2O_5$). The resulting mixture was dehydrochlorinated under reduced pressure (176 mm) while heating slowly to 65° C. The reaction temperature was maintained at 65° C. for 16 hours, raised to 80° C. for 4 hours, then cooled to 60° C. 15.99 g $P_2O_5$ was added to the mixture to bring the polymer concentration to 12 percent. The mixture was heated under nitrogen atmosphere at 60° C. for 4 hours, 100° C. for 2 hours and 160° C. for 24 hours. As the temperature increased, stir opalescence began to occur at about 150° C. The mixture was finally heated to 190° C. for 4 hours. The polymer was precipitated in water, broken up with a blender, collected by suction filtration, washed with water and dried under reduced pressure (0.02 mm) at 100° C. Intrinsic viscosity, 7.8 dl/g.

Analysis calculated for $C_{35}H_{16}N_6O_4$: C, 71.92; H, 2.76; N, 14.38. Found: C, 71.01; H, 2.98; N, 13.06.

Various modifications may be made to the invention as described without departing from the spirit of the invention or the scope of the appended claims.

We claim:

1. A para-ordered aromatic heterocyclic copolymer having repeating units of the formula —(—Q—Ar—)$_m$—(—Q—Ph—)$_n$— wherein Q is

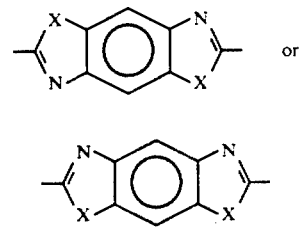

wherein X is —O—, —NH— or —S—, m is 0.05 to 0.50 and n is 1.0 - m, Ph is 1,4-phenylene, and wherein Ar is

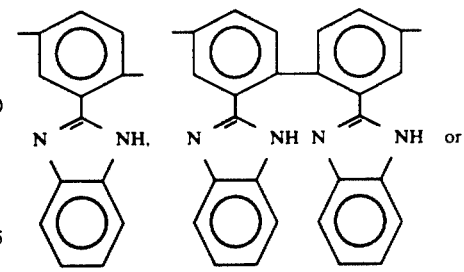

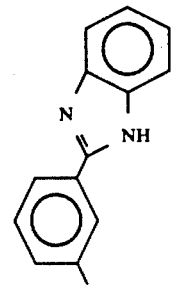

-continued
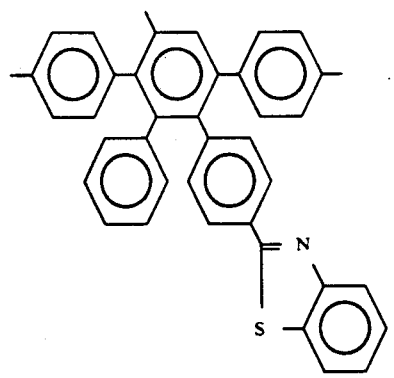
2. The polymer of claim 1 wherein X is —S— and wherein Ar is 2-benzimidazole.
* * * * *